US012753478B2

(12) United States Patent
Ryan et al.

(10) Patent No.: US 12,753,478 B2
(45) Date of Patent: Oct. 6, 2026

(54) THICKNESS CONTROL MANIFOLD FOR MOLTEN LITHIUM DIP COATING

(71) Applicant: GM GLOBAL TECHNOLOGY OPERATIONS LLC, Detroit, MI (US)

(72) Inventors: Daniel Ryan, Fenton, MI (US); Shaomao Xu, Sterling Heights, MI (US); Hassan Ghassemi-Armaki, Northville, MI (US); Jennifer Therese Bracey, Holly, MI (US); Jeffrey A. Abell, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 53 days.

(21) Appl. No.: 18/752,092

(22) Filed: Jun. 24, 2024

(65) Prior Publication Data

US 2025/0389006 A1 Dec. 25, 2025

(51) Int. Cl.

| | |
|---|---|
| ***C23C 2/16*** | (2006.01) |
| ***C23C 2/00*** | (2006.01) |
| ***C23C 2/04*** | (2006.01) |
| ***H01M 4/04*** | (2006.01) |

(Continued)

(52) U.S. Cl.

CPC ............ *C23C 2/16* (2013.01); *C23C 2/00344* (2022.08); *C23C 2/0035* (2022.08); *C23C 2/04* (2013.01); *C23C 2/52* (2022.08); *H01M 4/0404* (2013.01); *H01M 4/0471* (2013.01); *H01M 4/382* (2013.01); *H01M 2004/027* (2013.01)

(58) Field of Classification Search

USPC ........ 118/400, 419, 420, 422, 423, 426–429, 118/62, 63, 712, 666, 667

See application file for complete search history.

(56) References Cited

U.S. PATENT DOCUMENTS

| | | | | |
|---|---|---|---|---|
| 4,476,805 A * | 10/1984 | Higuchi | C23C 2/0035 118/69 |
| 2003/0140516 A1* | 7/2003 | Link | B65G 69/181 34/202 |

(Continued)

FOREIGN PATENT DOCUMENTS

| | | |
|---|---|---|
| CN | 114150246 A | 3/2022 |

OTHER PUBLICATIONS

German Office Action for German Application No. 102024123510.1; dated Feb. 21, 2025; 4 pages.

*Primary Examiner* — Yewebdar T Tadesse

(74) *Attorney, Agent, or Firm* — CANTOR COLBURN LLP

(57) ABSTRACT

Aspects of the disclosure include a thickness control manifold for molten lithium dip coating. An exemplary thickness control manifold includes a plurality of rollers positioned to guide a current collector from a feed roller to a molten lithium bath and to provide a vertical current collector pull from the molten lithium bath. A gas knife is positioned after the vertical current collector pull and against a side of the current collector. The manifold includes a cold gas tip having a first gas port and a first gas channel that is positioned to eject a cooled fluid to the side of the current collector and a hot gas tip having a second gas port and a second gas channel that is positioned to eject a heated fluid to the side of the current collector. The hot gas tip is between the cold gas tip and the molten lithium bath.

16 Claims, 9 Drawing Sheets

(51) Int. Cl.
*H01M 4/38* (2006.01)
*H01M 4/02* (2006.01)

(56) References Cited

U.S. PATENT DOCUMENTS

| | | | | |
|---|---|---|---|---|
| 2014/0366802 | A1* | 12/2014 | Itoh | C23C 2/185<br>118/712 |
| 2024/0136493 | A1 | 4/2024 | Ren et al. | |

* cited by examiner

THICKNESS CONTROL MANIFOLD FOR MOLTEN LITHIUM DIP COATING

INTRODUCTION

The present disclosure relates to battery cell manufacturing, and particularly to a thickness control manifold for molten lithium dip coating.

Lithium metal cells, also known as lithium metal batteries, are a type of rechargeable battery technology that have gained significant attention due to their high theoretical energy densities, meaning these types of batteries can potentially store more energy per unit mass or volume than conventional lithium-ion batteries. The anode (negative electrode) in a lithium metal cell is typically composed of metallic lithium, which has a relatively high specific capacity (e.g., 3,860 mAh/g) and a relatively low electrochemical potential (e.g., −3.04 V as measured against a hydrogen electrode). The cathode (positive electrode) can be made of various materials, such as lithium transition metal oxides (e.g., $LiCoO_2$, $LiNiMnCoO_2$, etc.), lithium metal phosphates (e.g., $LiFePO_4$), or other suitable compounds that can reversibly intercalate and deintercalate lithium ions.

The electrodes in a lithium metal cell are separated by an electrolyte, which is typically a lithium salt dissolved in an organic solvent or a solid polymer electrolyte. The electrolyte acts as a medium for lithium ion transport between the anode and cathode during charge and discharge processes. Current collectors provide a conductive pathway for electrons to flow between the electrodes and an external circuit. The current collector for the anode is typically made of copper or a copper alloy, while the current collector for the cathode is typically made of aluminum or an aluminum alloy.

During the discharge process, lithium metal atoms at the anode oxidize and release electrons, which flow through the external circuit to the cathode, providing electrical energy to power a device. At the same time, lithium ions migrate from the anode through the electrolyte and intercalate into the cathode material. During charging, this process is reversed, with lithium ions being extracted from the cathode and deposited back onto the anode as metallic lithium.

SUMMARY

In one exemplary embodiment a thickness control manifold includes a plurality of rollers positioned to guide a current collector from a feed roller to a molten lithium bath and to provide a vertical current collector pull from the molten lithium bath. A gas knife is positioned after the vertical current collector pull and against a side of the current collector. The manifold includes a cold gas tip having a first gas port and a first gas channel that is positioned to eject a cooled fluid to the side of the current collector and a hot gas tip having a second gas port and a second gas channel that is positioned to eject a heated fluid to the side of the current collector. The hot gas tip is between the cold gas tip and the molten lithium bath.

In addition to one or more of the features described herein, in some embodiments, the thickness control manifold includes a first servo-controlled arm and a second servo-controlled arm.

In some embodiments, the cold gas tip is positioned on the first servo-controlled arm. In some embodiments, the gas knife and the hot gas tip are positioned on the second servo-controlled arm.

In some embodiments, the first servo-controlled arm can dynamically adjust, horizontally or vertically, a relative position of the cold gas tip with respect to the current collector, and the second servo-controlled arm can dynamically adjust, horizontally or vertically, a relative position of the hot gas tip with respect to the current collector.

In some embodiments, the thickness control manifold includes a first temperature sensor positioned to measure a first temperature of a first region of the current collector located between the hot gas tip and the cold gas tip, and a second temperature sensor positioned to measure a second temperature of a second region of the current collector located above the cold gas tip.

In some embodiments, the hot gas tip further includes a cartridge heater positioned against the second gas channel and one or more wires coupled to the cartridge heater, the one or more wires configured to deliver power to the cartridge heater.

In some embodiments, the one or more material overflow passageways include one of a series of channels which traverse the gas knife or a single elongated slot that traverses the gas knife.

In some embodiments, the thickness control manifold includes a third gas tip positioned between the hot gas tip and the cold gas tip.

In some embodiments, the first gas port of the cold gas tip includes an orientation selected such that gas is ejected away from the molten lithium bath, the second gas port of the hot gas tip includes an orientation selected such that gas is ejected towards the molten lithium bath, and the third gas tip includes a third gas port having an orientation selected such that gas is ejected in a direction orthogonal to the current collector after the vertical current collector pull.

In yet another exemplary embodiment a method can include providing a plurality of rollers positioned to guide a current collector from a feed roller to a molten lithium bath and to provide a vertical current collector pull from the molten lithium bath. The method includes providing a gas knife positioned after the vertical current collector pull and against a side of the current collector. The method includes providing a cold gas tip having a first gas port and a first gas channel that is positioned to eject a cooled fluid to the side of the current collector and providing a hot gas tip having a second gas port and a second gas channel that is positioned to eject a heated fluid to the side of the current collector. The hot gas tip is between the cold gas tip and the molten lithium bath.

In some embodiments, the thickness control manifold includes a first servo-controlled arm and a second servo-controlled arm.

In some embodiments, the cold gas tip is positioned on the first servo-controlled arm. In some embodiments, the gas knife and the hot gas tip are positioned on the second servo-controlled arm.

In some embodiments, the first servo-controlled arm can dynamically adjust, horizontally or vertically, a relative position of the cold gas tip with respect to the current collector, and the second servo-controlled arm can dynamically adjust, horizontally or vertically, a relative position of the hot gas tip with respect to the current collector.

In some embodiments, the thickness control manifold includes a first temperature sensor positioned to measure a first temperature of a first region of the current collector located between the hot gas tip and the cold gas tip, and a second temperature sensor positioned to measure a second temperature of a second region of the current collector located above the cold gas tip.

In some embodiments, the hot gas tip further includes a cartridge heater positioned against the second gas channel and one or more wires coupled to the cartridge heater, the one or more wires configured to deliver power to the cartridge heater.

In some embodiments, the one or more material overflow passageways include one of a series of channels which traverse the gas knife or a single elongated slot that traverses the gas knife.

In some embodiments, the thickness control manifold includes a third gas tip positioned between the hot gas tip and the cold gas tip.

In some embodiments, the first gas port of the cold gas tip includes an orientation selected such that gas is ejected away from the molten lithium bath, the second gas port of the hot gas tip includes an orientation selected such that gas is ejected towards the molten lithium bath, and the third gas tip includes a third gas port having an orientation selected such that gas is ejected in a direction orthogonal to the current collector after the vertical current collector pull.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings.

DETAILED DESCRIPTION

Figure 1:
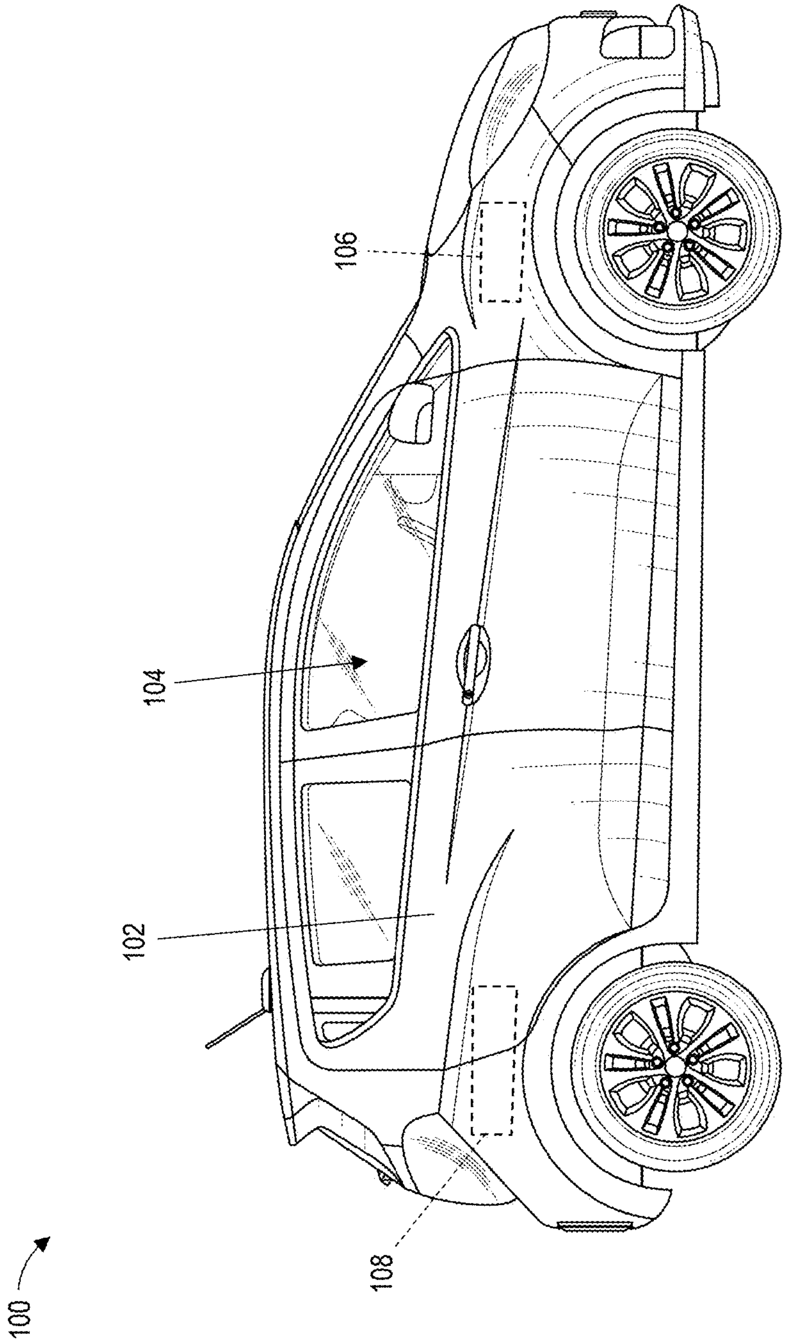
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features.

Electrodes often incorporate current collectors to supplement or otherwise improve upon the electrical energy storage characteristics of a final integrated device (e.g., a battery). A current collector typically includes a sheet of conductive material (e.g., aluminum foil) to which an active electrode material is attached. An energy storage system such as a battery cell or pouch can include a number of stacked anode current collectors and cathode current collectors, an active material(s) dispersed or otherwise situated on the current collectors, and a sufficient number of separators to prevent shorts between the anode current collectors and cathode current collectors. Thus, in many electrode configurations there is a clear separation between anode and cathode, and each electrode serves a specific function, with electrons flowing from the anode to the cathode through an external circuit.

As the demand for energy storage systems offering higher energy densities, faster charging, and extended operational lifespans increases, driven in part by the proliferation of electric vehicles, significant challenges have been imposed on the materials used in battery cell components. Research and development efforts are continuously directed toward identifying novel materials and manufacturing techniques that can meet escalating demands on battery cells and other energy storage systems.

Lithium metal cells, for example, are an increasingly relied upon rechargeable battery technology. Lithium metal cells have the potential to offer significantly higher energy densities as compared to conventional lithium-ion batteries, making them attractive for applications that require high energy storage capacity, such as electric vehicles and grid-scale energy storage systems. In particular, lithium metal has a very high theoretical specific capacity of 3,860 mAh/g, which translates to a relatively higher energy density than found in conventional lithium-ion batteries. Moreover, lithium metal has a low electrochemical potential (−3.04 V as compared to standard hydrogen electrode), which results in a higher cell voltage when paired with suitable cathode materials. The potentially higher specific capacities and higher voltages can lead to batteries having improved energy efficiency and reduced heat generation.

Challenges remain, however, in designing and manufacturing lithium metal batteries. On the manufacturing side, for example, challenges include sourcing, fabricating, and handling the lithium metal anodes. Lithium metal is a highly reactive material, making its production and handling more complex and costly compared to the other types of anode materials used in conventional lithium-ion batteries. The processes for extracting and purifying lithium metal require specialized facilities and strict safety protocols, which can increase manufacturing costs. Moreover, building thin and uniform lithium metal anodes is difficult, as lithium metal is soft and malleable, making it prone to dendrite formation and uneven deposition during the anode fabrication process. This can lead to reduced cycle life and inconsistent performance across cells. Lithium metal is also highly reactive with air and moisture, necessitating strict environmental controls during anode fabrication and cell assembly. Lithium metal anode manufacturing often relies upon specialized equipment for air and moisture control, such as dry rooms or gloveboxes, which can significantly increase manufacturing costs and complexity. Turning now to cell assembly, careful handling is required to ensure anode integrity and to prevent short circuits via inadvertent lithium metal contact. The result is a more labor-intensive manufacturing process which requires specific quality control processes, potentially impacting production yields and costs, and ultimately, scalability.

The present disclosure provides systems and methods for manufacturing thin lithium metal anodes. In particular, this disclosure introduces a thickness control manifold for molten lithium dip coating. Rather than relying upon a conventional horizontal lithium dip, the thickness control manifold described herein provides for a vertical (with respect to the molten lithium bath) current collector pull. In this configuration, a coated current collector is pulled vertically straight out of the molten lithium bath. In some embodiments, the thickness control manifold leverages both heated and chilled gas manifolds placed alongside the vertical current collector pull to manipulate and/or regulate the temperature of the coated current collector. The combination of a vertical current collector pull with the heated and chilled gas manifolds enables the manufacturing of thin lithium metal anodes with reduced excess material contact and minimized lithium waste. Moreover, the thickness control manifold enables precise thickness control for automated dual side lithium anode coatings.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Within the body 102 are arranged a number of components, including, for example, an electric motor 106 (shown by projection under the front hood). The electric motor 106 is shown for ease of illustration and discussion only. It should be understood that the configuration, location, size, arrangement, etc., of the electric motor 106 is not meant to be particularly limited, and all such configurations (including multi-motor configurations) are within the contemplated scope of this disclosure.

The electric motor 106 is powered via a battery pack 108 (shown by projection near the rear of the vehicle 100). The battery pack 108 is shown for ease of illustration and discussion only. It should be understood that the configuration, location, size, arrangement, etc., of the battery pack 108 is not meant to be particularly limited, and all such configurations (including split configurations) are within the contemplated scope of this disclosure. Moreover, while the present disclosure is discussed primarily in the context of a battery pack 108 configured for the electric motor 106 of the vehicle 100, aspects described herein can be similarly incorporated within any system (vehicle, building, or otherwise) having an energy storage system(s) (e.g., one or more battery packs or modules), and all such configurations and applications are within the contemplated scope of this disclosure.

Figure 2B:
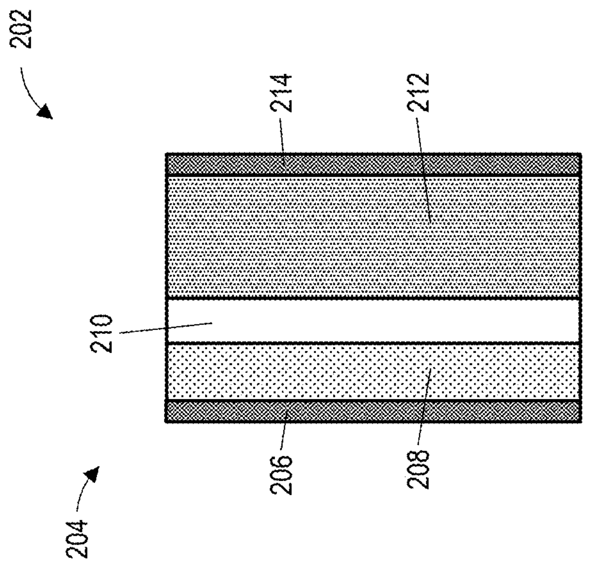
FIG. 2B is a detailed view of the battery cell shown in FIG. 2A in accordance with one or more embodiments.
Figure 2A:
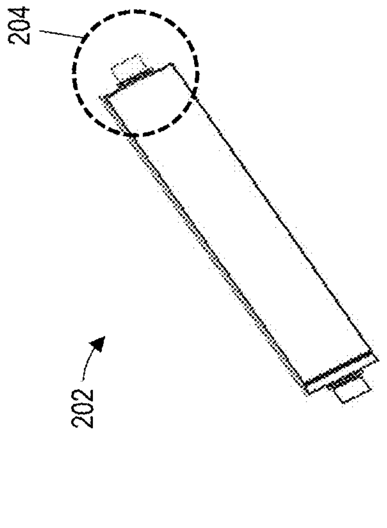
FIG. 2A is an example battery cell in accordance with one or more embodiments.
Figure 3:
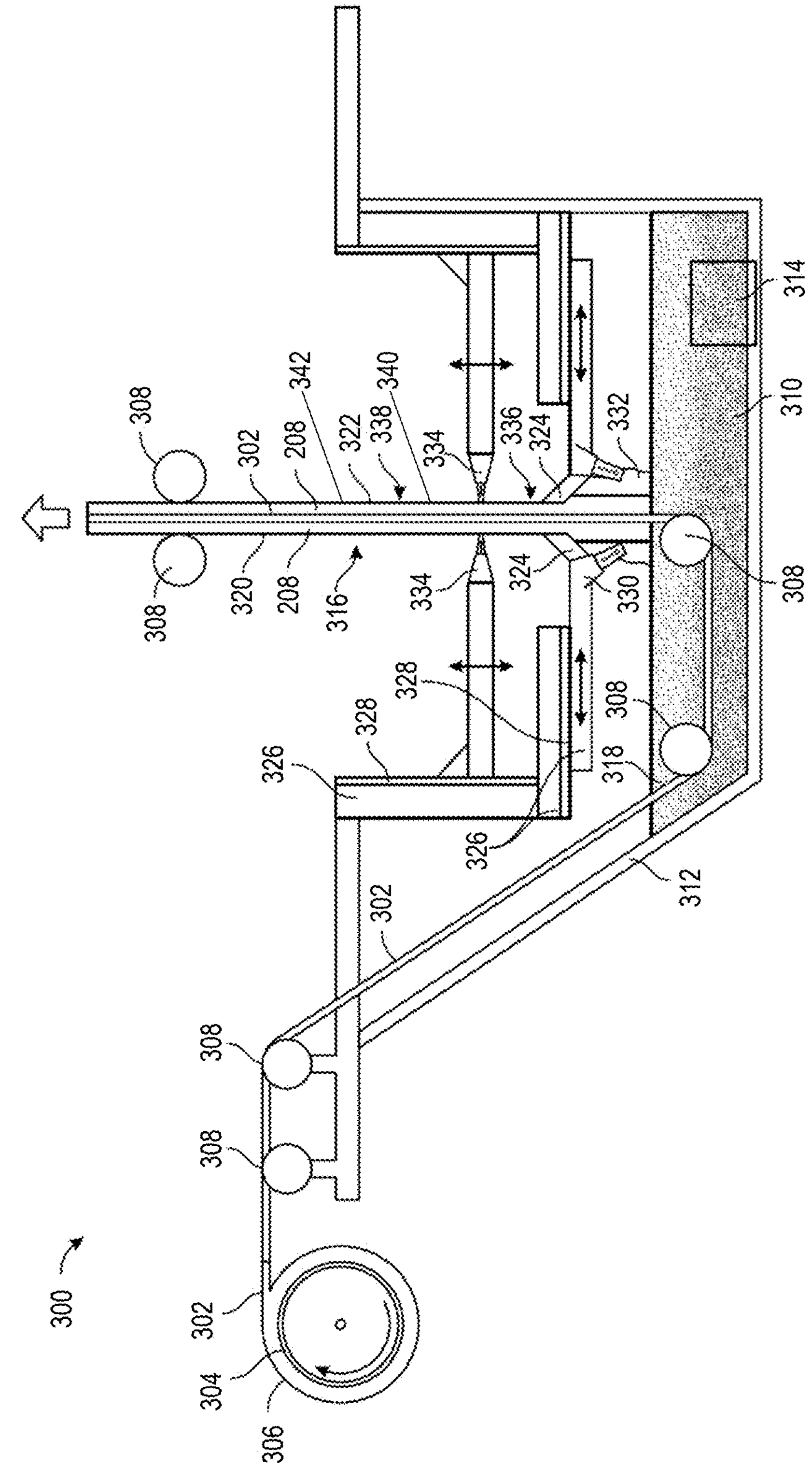
FIG. 3 is a thickness control manifold for making a thin lithium metal anode from molten lithium for a battery cell in accordance with one or more embodiments.

As will be detailed herein, the battery pack 108 includes one or more battery modules and/or battery pouches having one or more lithium metal anodes manufactured using molten lithium dip coating regulated via a thickness control manifold. An example battery cell is shown in FIG. 2A. A detailed view of the battery cell of FIG. 2A is shown in FIG. 2B. A thickness control manifold for manufacturing lithium metal anodes is shown in FIG. 3.

FIG. 2A illustrates an example battery cell 202 in accordance with one or more embodiments. The battery cell 202 can be incorporated as one of a number of battery cells in a battery pack (e.g., the battery pack 108 in FIG. 1). FIG. 2B illustrates a detailed view 204 of the battery cell 202 shown in FIG. 2A in accordance with one or more embodiments. As shown in FIG. 2B, the battery cell 202 includes, from left to right, an anode current collector 206, an anode active material layer 208, a separator 210, a cathode active material layer 212, and a cathode current collector 214, configured and arranged as shown.

The anode current collector 206 and the cathode current collector 214 can be made of sheets or foils of conductive materials. For example, the cathode current collector 214 can be made of aluminum foil, stainless steel, and/or titanium foil. Other materials are possible, such as, for example, semimetals (e.g., tin, graphite) and alloys of the metals and/or semimetals thereof. In some embodiments, the cathode current collector 214 is made of aluminum foil. The anode current collector 206 can include, for example, copper foil and/or one or more graphene layers. In some embodiments, the anode current collector 206 is made of copper foil. Each layer thickness can be approximately 1 to 3 nm, although other thicknesses are within the contemplated scope of this disclosure.

In some embodiments, the anode active material layer 208 is a lithium metal layer (also referred to as a lithium metal anode). In some embodiments, the anode active material layer 208 includes lithium metal deposited onto the anode current collector 206 via molten lithium dip coating in combination with a thickness control manifold (refer to FIG. 3). The formation of the anode active material layer 208 is discussed in greater detail with respect to FIG. 3.

In some embodiments, the cathode active material layer 212 includes a cathode active material(s). The cathode active material layer 212 is not meant to be particularly limited, but can include, for example, nickel manganese cobalt oxide (NMC), lithium iron phosphate (LFP), nickel cobalt aluminum oxide (NCA), nickel cobalt manganese aluminum oxide (NCMA), lithium manganese iron phosphate (LMFP), lithium manganese rich (LMR), lithium manganese oxide (LMO), and lithium nickel manganese oxide (LNMO).

Depending on battery construction (e.g., conventional vs. bi-polar current collectors, etc.) the separator 210 is optional but, if included, can be positioned to isolate the anode active material layer 208 and the cathode active material layer 212. The separator 210 can include dielectric materials such as, for example, polyethylene (PE), polypropylene (PP), polyethylene terephthalate (PET), and composites thereof, although other dielectrics are within the contemplated scope of this disclosure. In some embodiments, the separator 210 may include a thermally stable coating layer to improve shrinkage behavior (e.g., a porous ceramic coating or porous ester type polymer coating including, for example, polyimide, polyamide, polyimide-polyamide (PI/PA) copolymer, etc.).

FIG. 3 illustrates a thickness control manifold 300 for making a thin lithium metal anode from molten lithium for a battery cell (e.g., the battery cell 202 in FIG. 2B) in accordance with one or more embodiments. As shown in FIG. 3, thickness control manifold 300 includes a current collector 302 (e.g., anode current collector 206, refer FIG. 2B). The current collector 302 may be arranged on a feed roller 304 having collector layers 306 wound in a spiral or coil. The feed roller 304 may be controlled automatically (via, e.g., a feed motor, not separately shown) or manually. In some embodiments, the current collector 302 is unwound from the feed roller 304 and pushed, pulled, or otherwise retrieved (collectively "fed") along one or more idle rollers 308 (also referred to as pull rollers or positioning rollers) continuously and/or periodically, as desired. In this manner, the current collector 302 can be directed to and through a molten lithium bath 310.

In some embodiments, molten lithium bath 310 includes a batch of lithium metal stock (not separately indicated), such as lithium or lithium-alloy ingots, pellets, discs, granules, etc., that is melted in a vessel 312. Vessel 312 is not meant to be particularly limited, but can include, for example, a stainless steel chamber and/or an iron, nickel, tantalum, and/or boron-nitride crucible. In some embodiments, vessel 312 includes heating elements 314 to melt the lithium metal stock, thereby providing the molten lithium bath 310. For example, the heating elements 314 might include a pair of 15-25 kW (30-80 Khz) electrical induction or resistance heating elements. The molten lithium bath 310 can be heated to any desired temperature, such as 180, 220, and/or 300 degrees Celsius, or between 160 degrees Celsius and 320 degrees Celsius (±5 degrees Celsius). The molten lithium bath 310 may be melted for a predetermined minimum melt time (e.g., for at least 20 minutes to 120 minutes, or longer) as desired to obtain a substantially homogeneous melt. In some embodiments, the molten lithium bath 310 is a melt primarily made of lithium metal. In some embodiments, the molten lithium bath 310 also includes additional materials, such as oxides, which can be distributed along a gradient within the molten lithium bath 310 (as shown).

In some embodiments, two or more of the idle rollers 308 are positioned to provide a so-called vertical current collector pull 316, whereby the current collector 302 is pulled from the molten lithium bath 308 in a direction that is substantially orthogonal to a major surface 318 of the molten lithium bath 308 (in other words, the current collector 302 can be pulled vertically straight out of the molten lithium bath 308). Pulling the current collector 302 through the molten lithium bath 310 in this manner results in pulling up melted lithium metal stock material onto the current collector 302. Advantageously, the vertical movement of the current collector 302 enables a gravity-assigned material balancing (loading) of the current collector 302 with melted lithium metal stock material, thereby forming an anode active material layer 208 on both sides 320, 322 of the current collector 302.

In some embodiments, thickness control manifold 300 includes one or more gas knives 324 positioned to remove excess lithium material from the sides 320, 322 of the current collector 302. In some embodiments, a pair of gas knives 324 are positioned opposite the sides 320, 322 of the current collector 302 (as shown). In some embodiments, the gas knives 324 are positioned on servo-controlled arms 326 which can dynamically adjust, horizontally and/or vertically, a relative position of a gas knife 324 with respect to the current collector 302, thereby allowing for precise thickness control of the deposited anode active material layer 208. For example, the gas knives 324 can be moved horizontally further from the sides 320, 322 of the current collector 302 to increase the deposited thickness of the anode active material layer 208. Conversely, for example, gas knives 324 can be moved horizontally towards the sides 320, 322 of the current collector 302 to decrease the deposited thickness of the anode active material layer 208. In some embodiments, the position of the gas knives 324 can be adjusted using the servo-controlled arms 326 in combination with proximity sensors, cameras, lasers, and/or other means for measuring a current position of the gas knives 324 (and respective coating thickness of the anode active material layer 208). In some embodiments, the servo-controlled arms 326 include actuators (e.g., linear actuators) with sensors (e.g., feedback sensors) for closed loop control (these internal elements are not separately indicated). In some embodiments, the gas knives 324 include a weep passage(s) (refer to FIG. 5A) for removing overflow lithium.

In some embodiments, the servo-controlled arms 326 include interface material layers 328. While not meant to be particularly limited, interface material layers 328 can include insulator materials and/or wear materials. Insulator materials include, for example, polytetrafluoroethylene (PTFE), polyimide (PI), and various ceramics, such as alumina ($Al_2O_3$) and zirconia ($ZrO_2$) based ceramics. Wear materials include, for example, polymers such as ultra-high molecular weight polyethylene (UHMWPE), polyetheretherketone (PEEK), polyamide-imide (PAI), and PTFE. In some embodiments, the interface material layers 328 are insulating plates, although other configurations (e.g., insulating slides, etc.) are within the contemplated scope of this disclosure.

In some embodiments, the servo-controlled arms 326 are further coupled to one or more hot gas tip(s) 330. In some embodiments, the hot gas tips 330 are gas ports coupled to gas channels (refer FIG. 4) for delivering a heated gas (not separately indicated) to the sides 320, 322 of the current collector 302. In short, the hot gas tips 330 deliver localized heating to the current collector 302 at a location controlled according to the servo-controlled arms 326. While not meant to be particularly limited, the heating gas (or heating fluid) can include argon gas, although other fluids such as air and nitrogen are within the contemplated scope of this disclosure.

In some embodiments, the hot gas tips 330 heat the heated gas to a temperature of between 100 degrees Celsius and 350 degrees Celsius, for example, 300 degrees Celsius. The hot gas tips 330 can include or be coupled to a suitable heating element (not separately indicated), such as, for example, induction heating elements, heating bands, heating rods, heating plates, etc. Advantageously, the hot gas tips 330 can be positioned (refer to FIG. 5A) to direct a heated gas flow towards any excess lithium 332 which has been inadvertently pulled up with the current collector 302. Notably, the excess lithium 332 will be further from the sides 320, 322 of the current collector 302 and will often have a higher concentration of impurities, such as oxides, leaving a more pure lithium coating to serve as the anode active material layer 208. This is due to the fact that the impurities (oxides) are distributed in a gradient throughout the molten lithium bath 310 with the highest concentrations of impurities occurring near the major surface 318 of the molten lithium bath 308 as discussed previously.

In some embodiments, the servo-controlled arms 326 are further coupled to one or more cold gas tip(s) 334. In some embodiments, the cold gas tips 334 are gas ports coupled to gas channels (refer FIG. 4) for delivering a cooled gas (not separately indicated) to the sides 320, 322 of the current collector 302. In short, the cold gas tips 334 deliver localized cooling to the current collector 302 at a location controlled according to the servo-controlled arms 326. While not meant to be particularly limited, the cooling gas (or cooling fluid) can include argon gas, although other fluids such as air and nitrogen are within the contemplated scope of this disclosure.

In some embodiments, the cold gas tips 334 cool the cooled gas (e.g., chilled argon) to an ambient temperature of between 15 degrees Celsius and 35 degrees Celsius, for example, 22 degrees Celsius. In some embodiments, the cold gas tips 334 cool the cooled gas (e.g., chilled argon) to a sub-ambient temperature of less than 15 degrees Celsius, for example, 0 degrees Celsius, negative 15 degrees Celsius, etc. The cold gas tips 334 can include or be coupled to a suitable cooling element (not separately indicated), such as, for example, temperature-controlled inert fluids such as nitrogen gas, exposure to Peltier plates, etc. Advantageously, the cold gas tips 334 can be positioned as desired (refer to FIGS. 6A, 6B, and 6C) to direct a cooled gas flow towards the sides 320, 322 of the current collector 302, thus guiding the flow and solidification of lithium onto the current collector 302 after leaving the molten lithium bath 310. Directing a cooled gas to the current collector 302 in this manner, in combination with the vertical current collector pull 316, enables the manufacture of anode active material layers 208 having a substantially uniform thickness. As used herein, a "substantially uniform thickness" means that a difference in a nominal thickness between the anode active material layers 208 is below 100 microns, or 50 microns, depending on tooling limits.

In some embodiments, thickness control manifold 300 includes one or more sensors 336, 338 for monitoring a condition of the current collector 302 and/or anode active material layer 208. In some embodiments, sensors 336, 338 include positioning sensors for monitoring and/or maintaining a targeted position for the servo-controlled arms 326 such as, for example, proximity sensors, cameras, light detection and ranging (LIDAR) sensors, etc. In some embodiments, sensors 336, 338 include thermal sensors for monitoring and/or maintaining a temperature of the current collector and/or anode active material layer 208 such as, for example, thermocouples, resistance temperature detectors (RTDs), thermistors, infrared (IR) temperature sensors, etc. In some embodiments, sensors 336 are positioned between the hot gas tip(s) 330 and the cold gas tip(s) 334 (as shown). In some embodiments, sensors 338 are positioned after (above) the cold gas tip(s) 334 (as shown). In some embodiments, sensors 336 are thermal sensors positioned to measure a temperature of a first region 340 of the current collector 302 located between the hot gas tip 330 and the cold gas tip 334. In some embodiments, sensors 338 are thermal sensors positioned to measure a temperature of a second region 342 of the current collector 302 located after (above) the cold gas tip 334.

In some embodiments, the thickness control manifold 300 can be raised vertically away from the molten lithium bath 310 so that a current collector 302 can be routed through the idle rollers 308, for example, when switching to a new current collector feedstock. In some embodiments, the thickness control manifold 300 and one or more of the idle rollers 308 are configured as a single module and the servo-controlled arms 326 can lift the thickness control manifold 300 sufficiently to remove all idle rollers 308 from the molten lithium bath 310. In this configuration, a new current collector 302 can be routed through the idle rollers 308 and the entire assembly (the thickness control manifold 300 and the current collector 302) can be lowered into the molten lithium bath 310.

Figure 4:
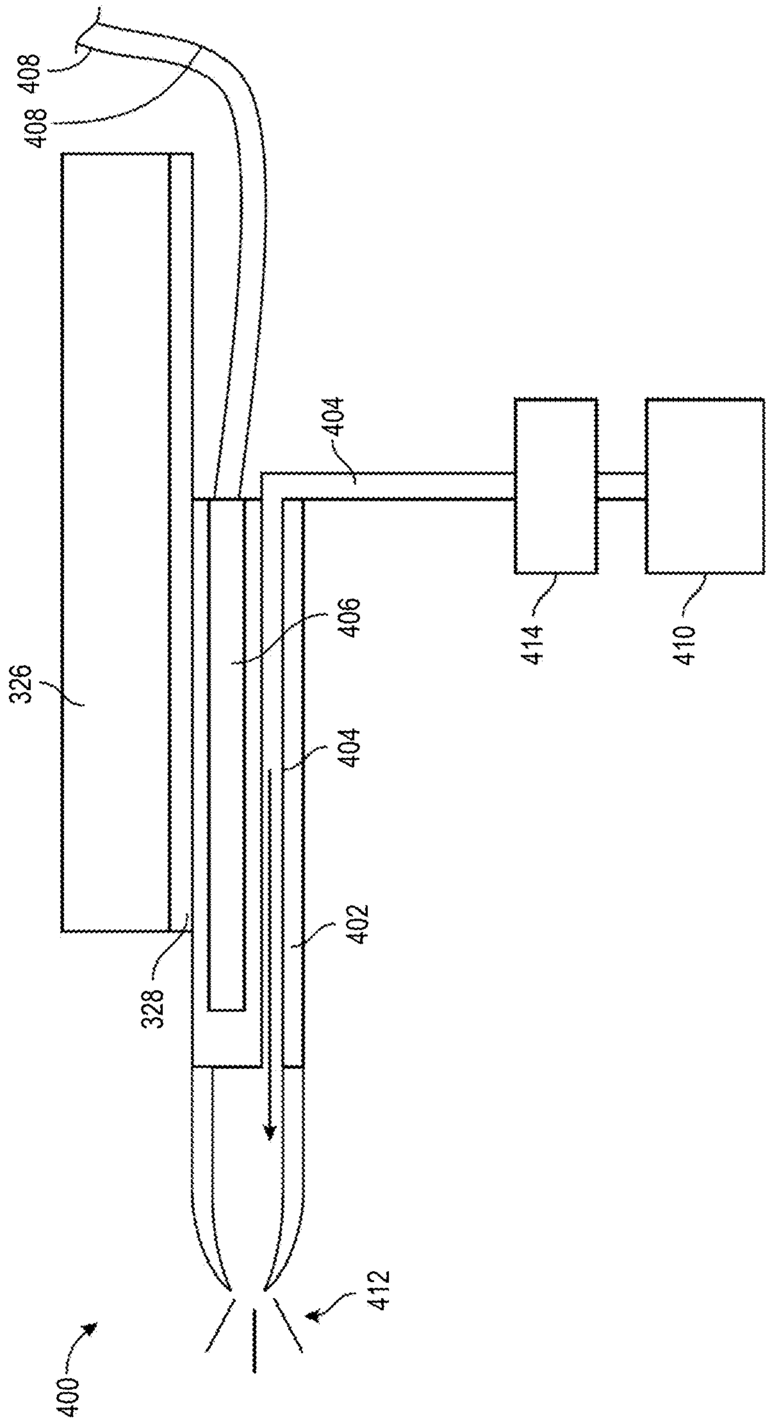
FIG. 4 is a gas tip configured in accordance with one or more embodiments.

FIG. 4 illustrates a gas tip 400 (e.g., hot gas tip 330, cold gas tip 334, refer to FIG. 3) in accordance with one or more embodiments. As shown in FIG. 4, gas tip 400 includes a body 402 having therein a gas channel 404. In some embodiments, gas channel 404 is positioned adjacent to a temperature control element 406 within body 402.

In some embodiments, temperature control element 406 can include a cartridge heater for heating applications (e.g., for hot gas tip 330). Conversely, temperature control element 406 can include a cooling cartridge for cooling applications (e.g., for cold gas tip 334). In any case, in some embodiments, the temperature control element 406 is coupled to wires 408. In some embodiments, the temperature control element 406 is a resistance-type heater or a thermoelectric cooler (TEC), and wires 408 deliver power (current) to the temperature control element 406, thereby heating (or cooling) the temperature control element 406 as desired.

Gas channel 404 can have any desired topography and/or routing. In some embodiments, the gas tip 400 is made of a material compatible with 3D printing techniques such as fused deposition modeling (FDM) and selective laser sintering (SLS). Example materials include, for example, polypropylene, polyethylene terephthalate, polyetheretherketone, polyamide, polyphenylene sulfide, and/or polysulfone. In this manner, arbitrarily complex routings can be fabricated for gas channel 404.

In some embodiments, gas channel 404 is coupled to a gas source 410 (e.g., an argon gas source, a nitrogen gas source, etc.). In some embodiments, gas 412 (e.g., argon) is directed, pumped, etc. from the gas source 410 through gas channel 404. In some embodiments, gas channel 404 is coupled to a pump 414 for directing (pumping) gas 412 through the gas tip 400. While not meant to be particularly limited, pump 414 can include, for example, a valve-regulated unidirectional pump, a positive displacement pump, a rotary-vane vacuum pump, etc. In some embodiments, gas 412 is pressurized, e.g., via pump 414, to a predetermined differential ejection pressure of about 40 Pa to about 400 Pa.

Figure 5B:
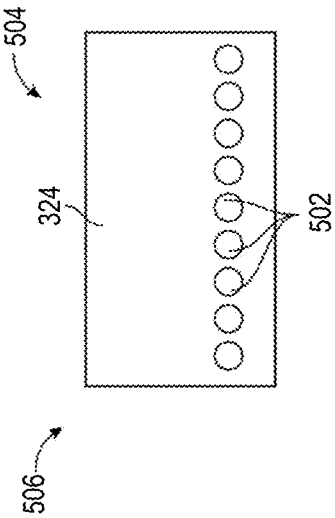
FIG. 5B is a detailed top-down view of a first example configuration for a material overflow passageway of a gas knife in accordance with one or more embodiments.
Figure 5C:
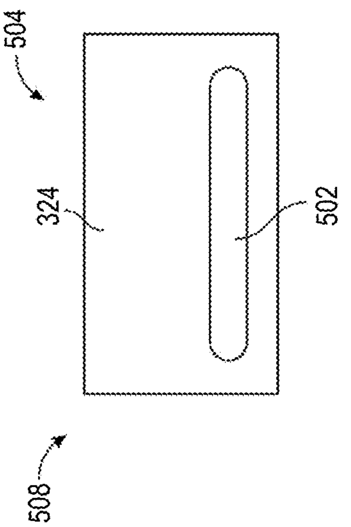
FIG. 5C is a detailed top-down view of a second example configuration for a material overflow passageway of a gas knife in accordance with one or more embodiments.
Figure 5A:
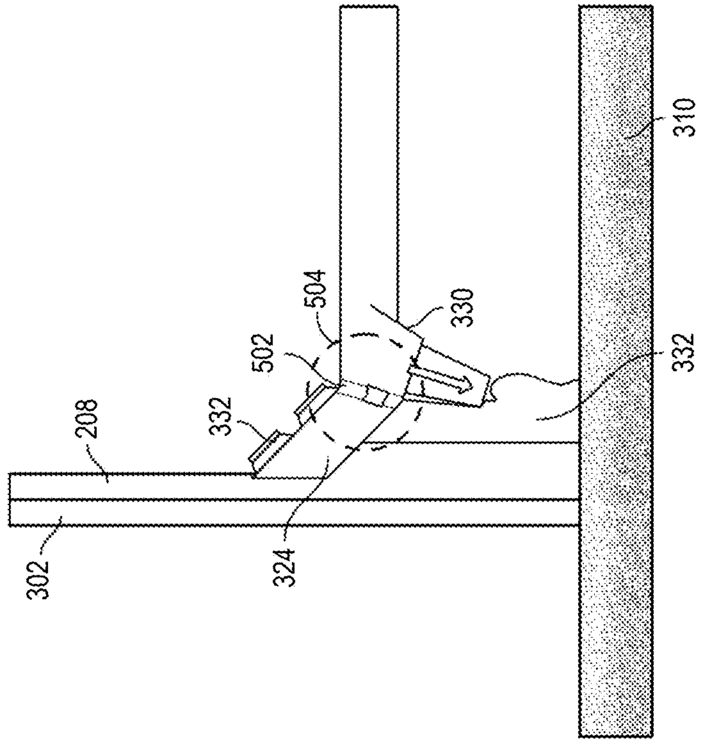
FIG. 5A is a detailed view of a gas knife in accordance with one or more embodiments.

FIG. 5A illustrates a detailed view of a gas knife 324 (refer to FIG. 3) in accordance with one or more embodiments. As shown in FIG. 5A, gas knife 324 can include one or more material overflow passageways 502 (also referred to as weep pathways). In some embodiments, the material overflow passageways 502 are positioned through the gas knife 324 to allow for excess lithium 332, which has been inadvertently pulled up with the current collector 302, to return to the molten lithium bath 310.

FIG. 5B illustrates a detailed top-down view 504 of a first example configuration 506 for the material overflow passageways 502. In this configuration, a plurality of material overflow passageways 502 are arranged in a series of channels running through the gas knife 324. FIG. 5C illustrates a detailed top-down view 504 of a second example configuration 508 for the material overflow passageways 502. In this configuration, a single material overflow passageway 502 is configured as an elongated slot running through the gas knife 324. While shown as having a single bank of material overflow passageways 502 (refer to FIG. 5B) or as having a single material overflow passageway 502 (refer to FIG. 5C), this is only for convenience. The material overflow passageways 502 can be configured with as many weep pathways as desired, in any arrangement (a single bank, multiple banks, scattered, etc.), and all such configurations are within the contemplated scope of this disclosure.

Figure 6B:
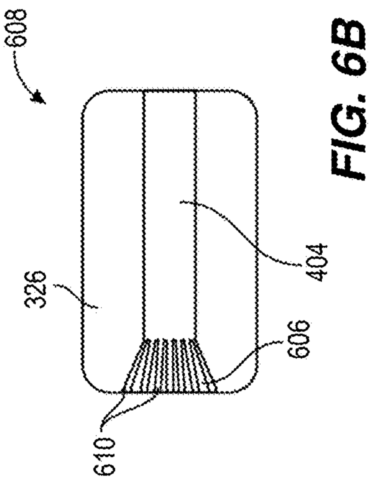
FIG. 6B is a first example configuration for a finishing tip in accordance with one or more embodiments.
Figure 6C:
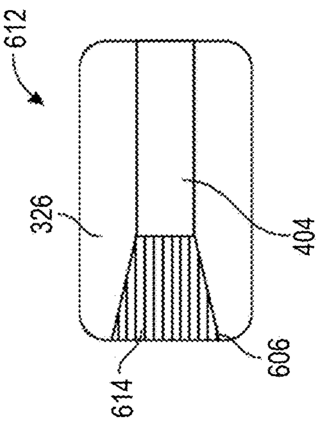
FIG. 6C is a second example configuration for a finishing tip in accordance with one or more embodiments.
Figure 6A:
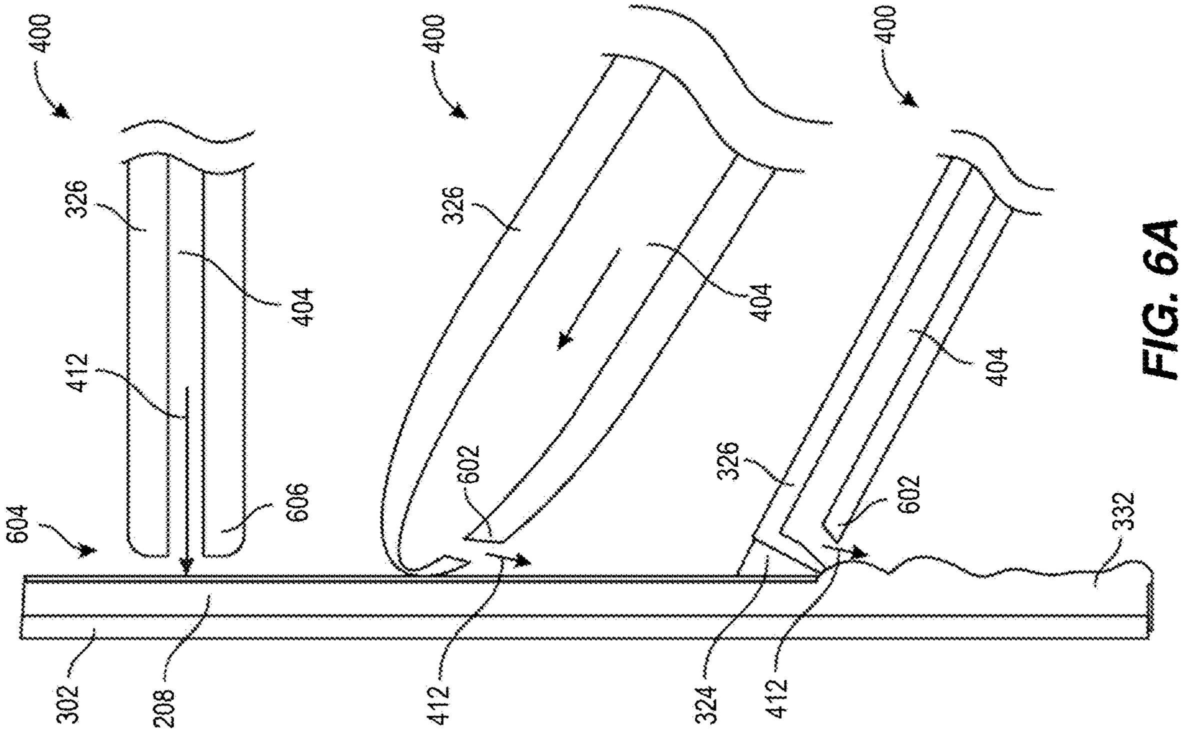
FIG. 6A is a portion of an embodiment of a thickness control manifold in accordance with one or more embodiments.

FIG. 6A illustrates a portion of an embodiment of a thickness control manifold 300 in accordance with one or more embodiments. As shown in FIG. 6A, thickness control manifold 300 can include a series of gas tips 400 (refer FIG. 4). In some embodiments, the gas tips 400 are arranged in a vertical stack of two or more gas tips 400 (as shown, three gas tips 400). The gas tips 400 can be hot gas tips 330 and/or cold gas tip(s) 334, as desired. In other words, gas tips 400 can be used individually or collectively, as desired, to control target characteristics such as thickness, surface finish, and/or porosity of the anode active material layer 208.

In some embodiments, one or more gap tips 400 includes a gas port 602 for ejecting gas 412. In some embodiments, a position of a gas port 602 for ejecting gas 412 can be fixed.

Alternatively, or in addition, in some embodiments, one or more gas ports 602 can be dynamically moved via, for example, actuators, depending on the needs of a given application (e.g., depending on line speed, material viscosity, material composition, etc.).

In some embodiments, each gas tip 400 need not have a same internal configuration. For example, in some embodiments, one or more of the gas tips 400 can be configured to eject gas 412 in a direction that is orthogonal to the anode active material layer 208 (refer to topmost gas tip 400), while one or more other gas tips 400 can be configured to eject gas 412 back towards the molten lithium bath 310 (refer to middle and bottommost gas tips 400). In some embodiments, one or more gas tips 400 are configured to maintain a gap 604 from the anode active material layer 208 and to eject gas 412 in a directly orthogonal to the anode active material layer 208 (refer to topmost gas tip 400). Such a configuration allows the respective gas tip 400 to provide a surface finishing treatment to the anode active material layer 208. Conversely, in some embodiments, one or more gas tips 400 are configured to be positioned directly against the anode active material layer 208 and to eject gas back towards the molten lithium bath 310 (refer to middle and bottommost gas tips 400). Such a configuration allows the respective gas tip 400 to direct excess lithium 332 back to the molten lithium bath 310 and to direct excess lithium 332 through any material overflow passageways 502 (refer to FIG. 5A).

In some embodiments, one or more of the gas tips 400 includes a finishing tip 606 (refer to topmost gas tip 400). The porting (routing) of the finishing tip 606 can vary depending on the needs of a given application. FIG. 6B illustrates a first example configuration 608 for a finishing tip 606. In this configuration, the finishing tip 606 includes a number of separate channels 610 to spread the ejection of gas 412 across a region of the anode active material layer 208. FIG. 6C illustrates a second example configuration 612 for a finishing tip 606. In this configuration, the finishing tip 606 includes a cone nozzle 614 for diffusing gas 412 prior to contacting the current collector 302 and/or anode active material layer 208.

Figure 7:
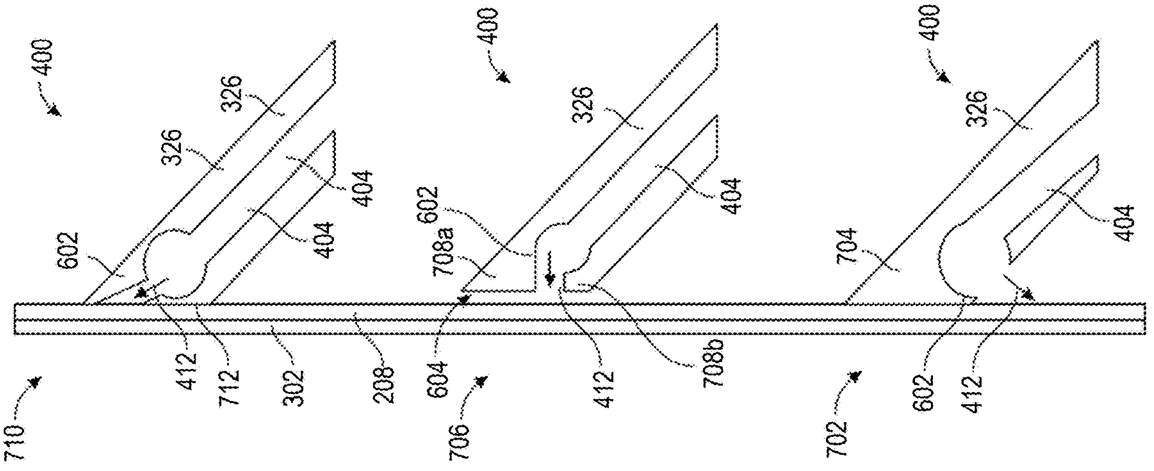
FIG. 7 is a portion of another embodiment of a thickness control manifold in accordance with one or more embodiments.

FIG. 7 illustrates a portion of another embodiment of a thickness control manifold 300 in accordance with one or more embodiments. As shown in FIG. 7, thickness control manifold 300 can include a series of gas tips 400 (refer FIG. 4). In some embodiments, the gas tips 400 are arranged in a vertical stack of two or more gas tips 400 (as shown, three gas tips 400). The gas tips 400 can be hot gas tips 330 and/or cold gas tip(s) 334, as desired. In other words, gas tips 400 can be used individually or collectively, as desired, to control target characteristics such as thickness, surface finish, and/or porosity of the anode active material layer 208.

In some embodiments, each of the gap tips 400 includes a gas port 602 for ejecting gas 412. The orientation of each gas port 602 determines the ejection behavior of the gas 412. In some embodiments, an orientation of the gas port 602 of each respective gas tip 400 is different. In this manner, each gas port 602 (and respective gas tip 400) can be configured to optimize a different aspect of the formation of the anode active material layer 208.

In some embodiments, a first gas tip 702 has a gas port 602 with an orientation selected such that gas 412 is ejected towards the molten lithium bath 310. In some embodiments, the first gas tip 702 includes a pre-flow gas knife 704. The pre-flow gas knife 704 can be configured in a same or similar manner as the gas knives 324. As used herein, a "pre-flow" gas knife refers to a gas knife having porting that ejects gas 412 from a position between the pre-flow gas knife 704 and the molten lithium bath 310. The combination of a gas port 602 configured for ejection towards the molten lithium bath 310 and the inclusion of the pre-flow gas knife 704 promotes material formation before contacting the guide (the pre-flow gas knife 704) allowing for less material constraining any material overflow passageways 502 (refer to FIG. 5A) of the pre-flow gas knife 704.

In some embodiments, a second gas tip 706 has a gas port 602 with an orientation selected such that gas 412 is ejected in a direction orthogonal to the current collector 302. In some embodiments, the second gas tip 706 includes a center-flow gas knife 708. The center-flow gas knife 708 can be configured in a same or similar manner as the gas knives 324. As used herein, a "center-flow" gas knife refers to a gas knife having porting that ejects gas 412 from a position between portions 708*a* and 708*b* of the center-flow gas knife 708. In some embodiments, the second gas tip 706 is spaced from the current collector 304 to maintain a gap 604. This configuration allows gas 412 to serve as a buffer while forming the anode active material layer 208.

In some embodiments, a third gas tip 710 has a gas port 602 with an orientation selected such that gas 412 is ejected away from the molten lithium bath 310. In some embodiments, the third gas tip 710 includes a post-flow gas knife 712. The post-flow gas knife 712 can be configured in a same or similar manner as the gas knives 324. As used herein, a "post-flow" gas knife refers to a gas knife having porting that ejects gas 412 from a position above the post-flow gas knife 712 (that is, from a position opposite the molten lithium bath 310). The combination of a gas port 602 configured for ejection away from the molten lithium bath 310 and the inclusion of the post-flow gas knife 704 allows for the gas 412 to finish a surface of the anode active material layer 208 (e.g., eliminate drag marks, etc.).

Figure 8:
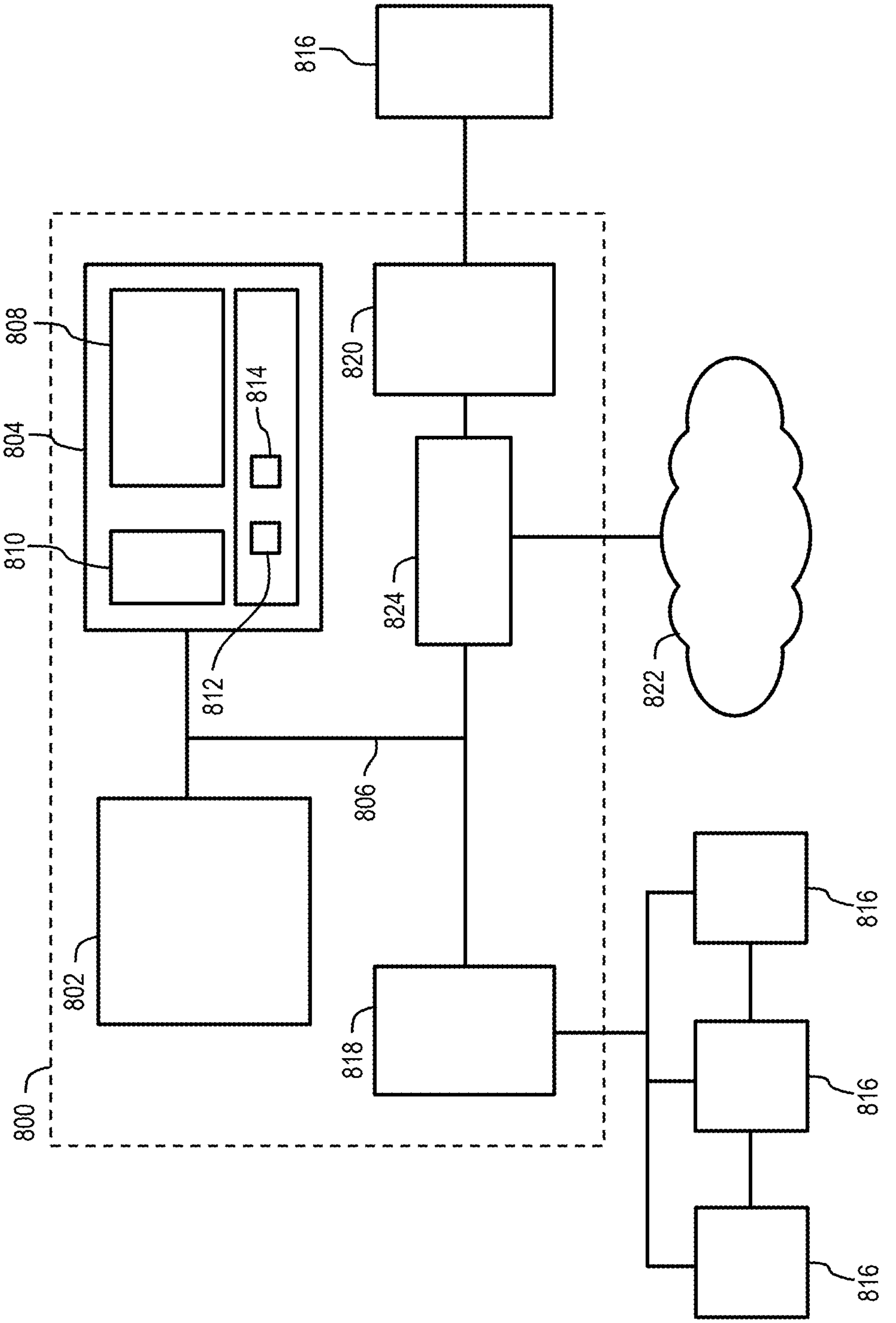
FIG. 8. is a computer system according to one or more embodiments.

FIG. 8 illustrates aspects of an embodiment of a computer system 800 that can perform various aspects of embodiments described herein. In some embodiments, the computer system(s) 800 can implement and/or otherwise be incorporated within or in combination with the thickness control manifold 300 (refer to FIG. 3). For example, in some embodiments, computer system 800 can receive and/or process sensor signals for one or more sensors 336, 338 for monitoring a condition of the current collector 302 and/or anode active material layer 208. In another example, in some embodiments, computer system 800 can control (via, e.g., control signals, etc.) the servo-controlled arms 326 to dynamically adjust, horizontally and/or vertically, a relative position of a gas knife (e.g., gas knife 324, etc.) with respect to the current collector 302, thereby allowing for precise thickness control of the deposited anode active material layer 208. In yet another example, in some embodiments, computer system 800 can control a pump, gas source, and/or temperature control element (refer to FIG. 4) to regulate and control ejection of gas 412.

The computer system 800 includes at least one processing device 802, which generally includes one or more processors or processing units for performing a variety of functions, such as, for example, controlling sensors, manipulating servo-controlled arms 326, regulating gas 412, etc., as described previously. Components of the computer system 800 also include a system memory 804, and a bus 806 that couples various system components including the system memory 804 to the processing device 802. The system memory 804 may include a variety of computer system readable media. Such media can be any available media that is accessible by the processing device 802, and includes both volatile and non-volatile media, and removable and non-removable media. For example, the system memory 804 includes a non-volatile memory 808 such as a hard drive, and may also include a volatile memory 810, such as random access memory (RAM) and/or cache memory. The computer system 800 can further include other removable/non-removable, volatile/non-volatile computer system storage media.

The system memory 804 can include at least one program product having a set (e.g., at least one) of program modules that are configured to carry out functions of the embodiments described herein. For example, the system memory 804 stores various program modules that generally carry out the functions and/or methodologies of embodiments described herein. A module or modules 812, 814 may be included to perform functions related to any of the block diagrams described herein. The computer system 800 is not so limited, as other modules may be included depending on the desired functionality of the computer system 800. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 802 can also be configured to communicate with one or more external devices 816 such as, for example, a keyboard, a pointing device, and/or any devices (e.g., a network card, a modem, etc.) that enable the processing device 802 to communicate with one or more other computing devices. Communication with various devices can occur via Input/Output (I/O) interfaces 818 and 820.

The processing device 802 may also communicate with one or more networks 822 such as a local area network (LAN), a general wide area network (WAN), a bus network and/or a public network (e.g., the Internet) via a network adapter 824. In some embodiments, the network adapter 824 is or includes an optical network adaptor for communication over an optical network. It should be understood that although not shown, other hardware and/or software components may be used in conjunction with the computer system 800. Examples include, but are not limited to, microcode, device drivers, redundant processing units, external disk drive arrays, RAID systems, and data archival storage systems, etc.

Figure 9:
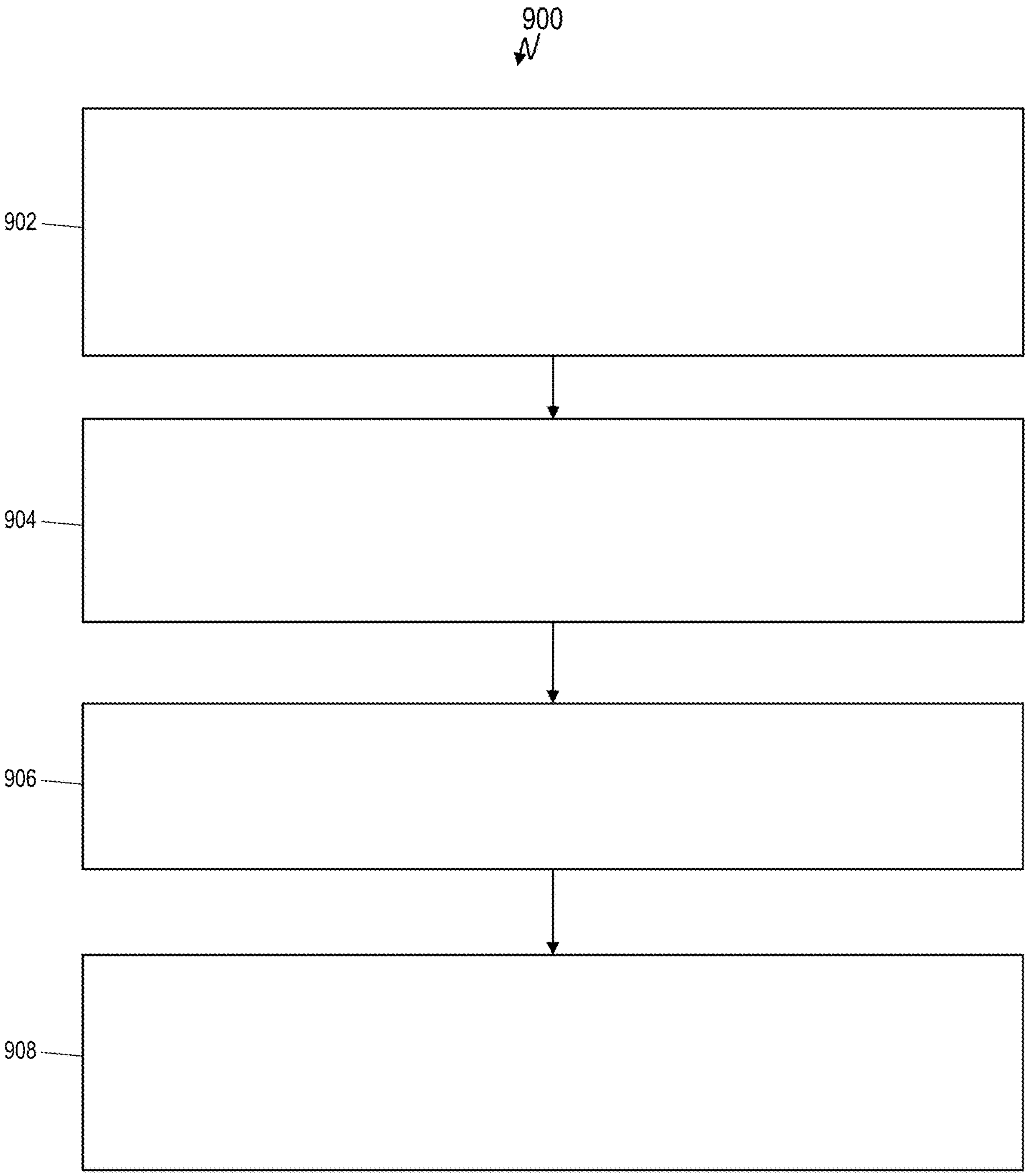
FIG. 9 is a flowchart in accordance with one or more embodiments.

Referring now to FIG. 9, a flowchart 900 for manufacturing lithium metal anodes using molten lithium dip coating is generally shown according to an embodiment. The flowchart 900 is described in reference to FIGS. 1-8 and may include additional steps not depicted in FIG. 9. Although depicted in a particular order, the blocks depicted in FIG. 9 can be rearranged, subdivided, and/or combined.

At block 902, the method includes providing a plurality of rollers positioned to guide a current collector from a feed roller to a molten lithium bath. In some embodiments, the plurality of rollers are further positioned to provide a vertical current collector pull such that the current collector is pulled from the molten lithium bath in a direction that is orthogonal to a major surface of the molten lithium bath.

At block 904, the method includes providing a gas knife positioned after the vertical current collector pull and against a side of the current collector. In some embodiments, the gas knife includes one or more material overflow passageways to allow excess lithium pulled up with the current collector to return to the molten lithium bath.

At block 906, the method includes providing a cold gas tip having a first gas port and a first gas channel. In some embodiments, the cold gas tip is positioned to eject a cooled fluid to the side of the current collector.

At block 908, the method includes providing a hot gas tip having a second gas port and a second gas channel. In some embodiments, the hot gas tip is positioned to eject a heated fluid to the side of the current collector. In some embodiments, the hot gas tip is between the cold gas tip and the molten lithium bath.

In some embodiments, the method includes providing a first servo-controlled arm and a second servo-controlled arm. In some embodiments, the cold gas tip is positioned on the first servo-controlled arm. In some embodiments, the gas knife and the hot gas tip are positioned on the second servo-controlled arm.

In some embodiments, the first servo-controlled arm can dynamically adjust, horizontally or vertically, a relative position of the cold gas tip with respect to the current collector. In some embodiments, the second servo-controlled arm can dynamically adjust, horizontally or vertically, a relative position of the hot gas tip with respect to the current collector.

In some embodiments, the method includes providing a first temperature sensor positioned to measure a first temperature of a first region of the current collector located between the hot gas tip and the cold gas tip. In some embodiments, the method includes providing a second temperature sensor positioned to measure a second temperature of a second region of the current collector located above the cold gas tip.

In some embodiments, the hot gas tip further includes a cartridge heater positioned against the second gas channel and one or more wires coupled to the cartridge heater. In some embodiments, the one or more wires are configured to deliver power to the cartridge heater.

In some embodiments, the one or more material overflow passageways include one of a series of channels which traverse the gas knife or a single elongated slot that traverses the gas knife.

In some embodiments, the method includes providing a third gas tip positioned between the hot gas tip and the cold gas tip.

In some embodiments, the first gas port of the cold gas tip includes an orientation selected such that gas is ejected away from the molten lithium bath, the second gas port of the hot gas tip includes an orientation selected such that gas is ejected towards the molten lithium bath, and the third gas tip includes a third gas port having an orientation selected such that gas is ejected in a direction orthogonal to the current collector after the vertical current collector pull.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A thickness control manifold for molten lithium dip coating, the thickness control manifold comprising:

a plurality of rollers positioned to guide a current collector from a feed roller to a molten lithium bath, the plurality of rollers further positioned to provide a vertical current collector pull such that the current collector is pulled from the molten lithium bath in a direction that is orthogonal to a major surface of the molten lithium bath;

a gas knife positioned after the vertical current collector pull and against a side of the current collector, the gas knife comprising one or more material overflow passageways to allow excess lithium pulled up with the current collector to return to the molten lithium bath;

a cold gas tip comprising a first gas port and a first gas channel, the cold gas tip positioned to eject a cooled fluid to the side of the current collector;

a hot gas tip comprising a second gas port and a second gas channel, the hot gas tip positioned to eject a heated fluid to the side of the current collector, and the hot gas tip arranged between the cold gas tip and the molten lithium bath; and a first servo-controlled arm and a second servo-controlled arm, wherein the first servo-controlled arm can dynamically adjust, horizontally or vertically, a relative position of the cold gas tip with respect to the current collector, and wherein the second servo-controlled arm can dynamically adjust, horizontally or vertically, a relative position of the hot gas tip with respect to the current collector.

2. The thickness control manifold of claim 1, wherein the cold gas tip is positioned on the first servo-controlled arm.

3. The thickness control manifold of claim 1, wherein the gas knife and the hot gas tip are positioned on the second servo-controlled arm.

4. The thickness control manifold of claim 1, further comprising:

a first temperature sensor positioned to measure a first temperature of a first region of the current collector located between the hot gas tip and the cold gas tip; and a second temperature sensor positioned to measure a second temperature of a second region of the current collector located above the cold gas tip.

5. The thickness control manifold of claim 1, the hot gas tip further comprising a cartridge heater positioned against the second gas channel and one or more wires coupled to the cartridge heater, the one or more wires configured to deliver power to the cartridge heater.

6. The thickness control manifold of claim 1, wherein the one or more material overflow passageways comprise one of a series of channels which traverse the gas knife or a single elongated slot that traverses the gas knife.

7. The thickness control manifold of claim 1, further comprising a third gas tip positioned between the hot gas tip and the cold gas tip.

8. The thickness control manifold of claim 7, wherein the first gas port of the cold gas tip comprises an orientation selected such that gas is ejected away from the molten lithium bath;

wherein the second gas port of the hot gas tip comprises an orientation selected such that gas is ejected towards the molten lithium bath; and wherein the third gas tip comprises a third gas port comprising an orientation selected such that gas is ejected in a direction orthogonal to the current collector after the vertical current collector pull.

9. A method comprising:

providing a plurality of rollers positioned to guide a current collector from a feed roller to a molten lithium bath, the plurality of rollers further positioned to provide a vertical current collector pull such that the current collector is pulled from the molten lithium bath in a direction that is orthogonal to a major surface of the molten lithium bath;

providing a gas knife positioned after the vertical current collector pull and against a side of the current collector, the gas knife comprising one or more material overflow passageways to allow excess lithium pulled up with the current collector to return to the molten lithium bath;

providing a cold gas tip comprising a first gas port and a first gas channel, the cold gas tip positioned to eject a cooled fluid to the side of the current collector;

providing a hot gas tip comprising a second gas port and a second gas channel, the hot gas tip positioned to eject a heated fluid to the side of the current collector, and the hot gas tip arranged between the cold gas tip and the molten lithium bath; and providing a first servo-controlled arm and a second servo-controlled arm, wherein the first servo-controlled arm can dynamically adjust, horizontally or vertically, a relative position of the cold gas tip with respect to the current collector, and wherein the second servo-controlled arm can dynamically adjust, horizontally or vertically, a relative position of the hot gas tip with respect to the current collector.

10. The method of claim 9, wherein the cold gas tip is positioned on the first servo-controlled arm.

11. The method of claim 9, wherein the gas knife and the hot gas tip are positioned on the second servo-controlled arm.

12. The method of claim 9, further comprising:

providing a first temperature sensor positioned to measure a first temperature of a first region of the current collector located between the hot gas tip and the cold gas tip; and providing a second temperature sensor positioned to measure a second temperature of a second region of the current collector located above the cold gas tip.

13. The method of claim 9, the hot gas tip further comprising a cartridge heater positioned against the second gas channel and one or more wires coupled to the cartridge heater, the one or more wires configured to deliver power to the cartridge heater.

14. The method of claim 9, wherein the one or more material overflow passageways comprise one of a series of channels which traverse the gas knife or a single elongated slot that traverses the gas knife.

15. The method of claim 9, further comprising providing a third gas tip positioned between the hot gas tip and the cold gas tip.

16. The method of claim 15, wherein the first gas port of the cold gas tip comprises an orientation selected such that gas is ejected away from the molten lithium bath;

wherein the second gas port of the hot gas tip comprises an orientation selected such that gas is ejected towards the molten lithium bath; and wherein the third gas tip comprises a third gas port comprising an orientation selected such that gas is ejected in a direction orthogonal to the current collector after the vertical current collector pull.

* * * * *